March 18, 1958     E. J. HERBENAR     2,827,303
VEHICLE SUSPENSION AND PIVOT ASSEMBLY THEREFOR
Filed Nov. 1, 1955     2 Sheets-Sheet 1
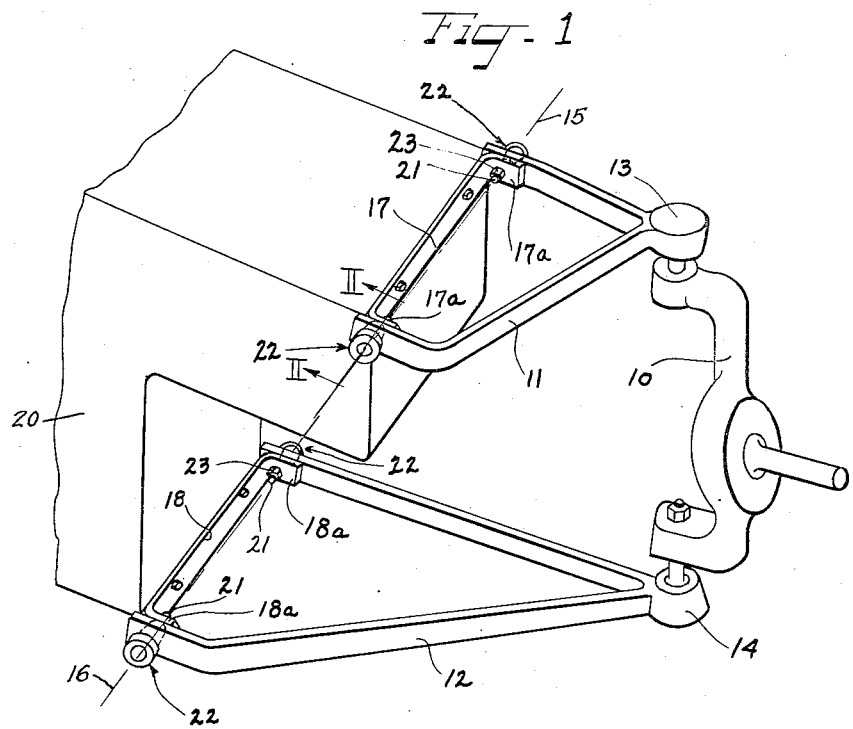
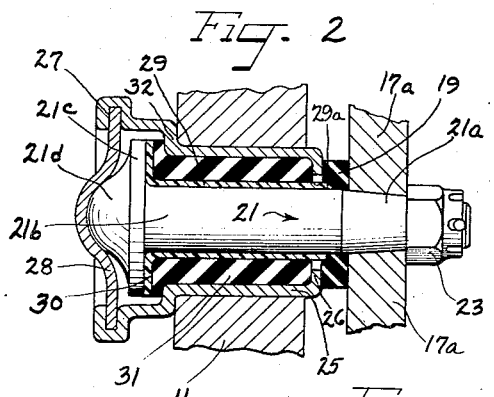
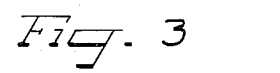
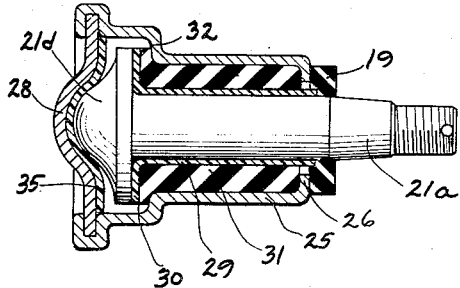
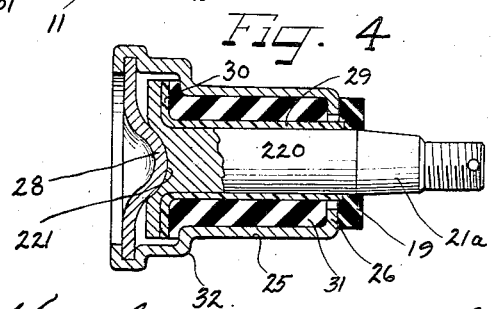
Inventor
Edward J. Herbenar

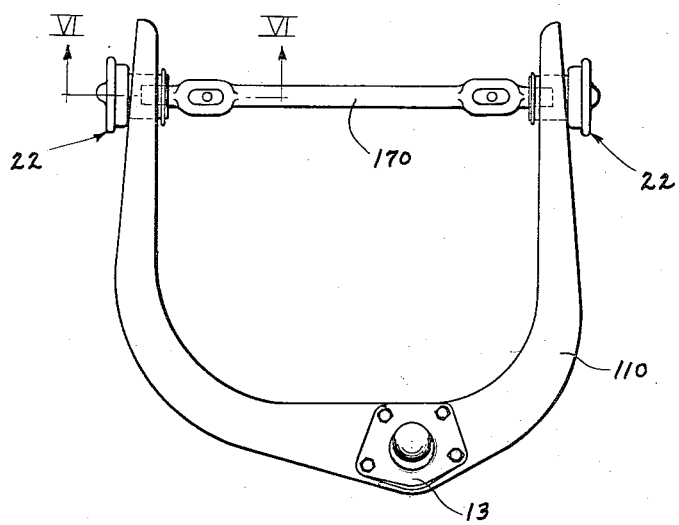
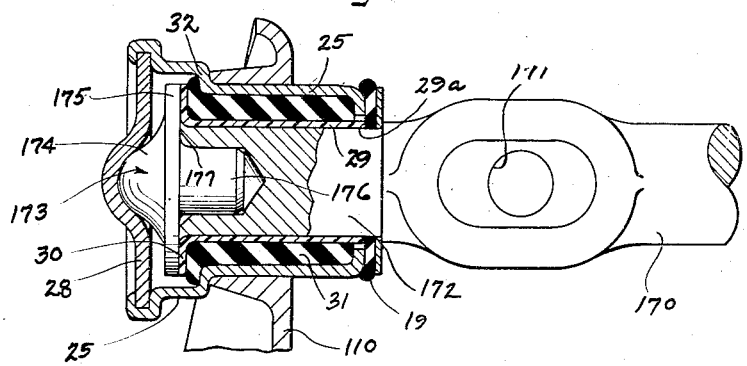
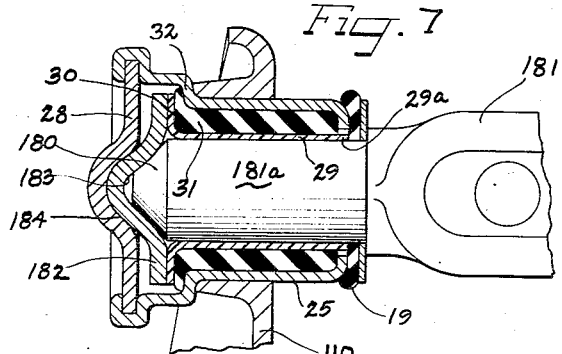

United States Patent Office 2,827,303
Patented Mar. 18, 1958

2,827,303

VEHICLE SUSPENSION AND PIVOT ASSEMBLY THEREFOR

Edward J. Herbenar, Detroit, Mich., assignor to Thompson Products, Inc., Cleveland, Ohio, a corporation of Ohio Application November 1, 1955, Serial No. 544,138

9 Claims. (Cl. 280—96.2)

The present invention relates to vehicle suspensions and is, more particularly, concerned with the provision of a novel and substantially improved resiliently mounted vehicle wheel suspension.

As those skilled in the art are aware, independent front wheel suspensions for automotive vehicles have been in use for many years. In the type commonly employed in American passenger vehicles, this suspension comprises a wheel support spindle which is pivotally carried for substantially vertical movement, as well as rotation about a substantially vertical axis, by a pair of substantially horizontal control arms pivotally connected to the vehicle frame at vertically spaced horizontal pivot points and to the support spindle at vertically spaced pivots. Such independent suspension systems are forced to withstand extremely heavy shocks imparted to the vehicle by the road over which it is traveling and must, in order to be commercially acceptable, withstand hard usage over a long period of time without undue wear.

In the prior art suspension systems with which I am familiar, pivot bushings are provided at the connections between the upper and lower control arms and the frame, in order to minimize friction at these points. These bushings may comprise threaded, grease lubricated bushings or, in some cases they may comprise rubber torsion type bushings in which the outside cylindrical surface of the rubber is bonded to the frame and the inner bore passing therethrough is bonded to a portion of the control arm. The threaded metallic construction requires constant lubrication, has no effective provision for misalignment and has no means for providing wear take-up. Further, the metallic type threaded bushing has no damping or sound insulating characteristics. On the other hand, the torsion type rubber bushing, while eliminating some of the disadvantages above mentioned add other undesirable characteristics. For example, they increase the spring rate of the vehicle as a result of the torsional effects in the rubber. Further, vehicle suspensions incorporating such torsion type rubber bushings have been found to be relatively unstable due to lateral displacement of the rubber during heavy duty operation and they have also been found to have a relatively short life due to the torsional stresses imposed on the rubber and the deterioration thereof under constant torsional strains.

The present invention contemplates the provision of a resilient bushing type suspension pivot arrangement in which all of the above mentioned defects of the prior art structures have been eliminated. The suspension of the present invention, hereinafter more fully described, is permanently lubricated, provides automatic wear take-up and at the same time provides sufficient resiliency for alignment purposes without introducing instability heretofore associated with resilient connections in any form.

In accordance with principles of the present invention, a pair of joints connect each of the control arms to the frame. Each of these joints, which provide substantially coaxially aligned pivot axes, comprises a central stud or rod member secured to the control arm or frame member and an outer cylindrical shell secured to the other of the frame or control arm members. A semi-resilient plastic liner, such as "nylon," is positioned between the stud and the shell and an annular, cylindrical, bushing of rubber or the like is positioned between the plastic liner and the shell in snug relationship therewith. The end of the stud not secured to either the arm or the frame is provided with an enlarged head having a substantially segmental spherical bearing portion thereon for cooperation with a concave substantially segmental spherical bearing portion secured in one end of the outer shell member. The enlarged annular portion of the stud head facing the direction opposite to the segmental spherical portion of the shell acts through a substantially radially extending portion of the plastic liner against the end of the rubber annulus. The opposite end of the rubber annulus is confined by a closure wall. In operation, this structure permits rotation between the stud and the shell such that the rotational wear friction occurs between the stud and the plastic linear thereby preventing any torsional twists from developing in the resilient or rubber material. Should the control arm attempt to move in the horizontal plane to impose lateral or transverse forces upon the pivot connections, the stud head must, in order to permit such lateral movement, become unseated relative to the segmental spherical shell portion. Such unseating requires, however, that the stud move axially and such axial movement is substantially resisted by the rubber material which must be compressed to permit such movement. Since the rubber material is confined, and is of very limited compressibility, lateral movements of the stud relative to the shell are effectively minimized. At the same time, however, misalignment is accommodated in the pivot joint since a tilting of the stud relative to the shell merely causes a slight displacement of the rubber from one side of the stud to the space on the opposite side of the stud without necessity for unseating the stud head from the concave segmental spherical portion of the shell. Thus, an effective pivot joint is provided which provides for slight misalignments in a resilient manner without deterioration of the rubber from the application of torsional stresses thereon. Further, by utilizing the rubber member in the joint, sounds and other vibrations are dampened in the joint, and wear is automatically taken up.

It is, accordingly, an object of the present invention to provide a substantially improved resiliently mounted independent front wheel suspension.

Still a further object of the present invention is to provide an improved joint for utilization in vehicle suspensions or the like.

Yet another object of the present invention is to provide a resilient vehicle suspension pivot in which lateral suspension movements are resiliently damped and resisted to thereby provide substantial vehicle stability.

Still another object of the present invention is to provide a permanently lubricated vehicle suspension in which vibrations imposed thereon at the vehicle wheels are substantially damped before they can be transmitted to the vehicle frame.

Another object of the invention is to provide a vehicle control arm pivot which permits slight frame-control arm misalignment without seriously impairing the efficiency of the suspension system.

A feature of the invention resides in the provision of a resilient bushing which permits antifriction rotation but substantially prevents either longitudinal movement of the pivot parts or lateral movement of the pivot parts relative to one another.

Another feature of the invention resides in the utilization of plastic lined resilient pivot connections at all points of connection between independent vehicle suspension control arms and the vehicle frame.

Another feature of the invention is the use of a convex, segmental spherical pivot stud head in combination with a concave segmental spherical socket portion, in combination with a resilient annular member surrounding the stud and confined in position therearound, to prevent undesired lateral instability in an independent vehicle wheel suspension.

Still other and further objects and features of the present invention will at once become apparent to those skilled in the art from a consideration of the attached drawings wherein several preferred embodiments of the invention are shown by way of illustration only, and wherein:

Figure 1 is a diagrammatic, isometric, illustration of an independent vehicle suspension incorporating the structure of the present invention;

Figure 2 is an enlarged view of an individual pivot joint, in cross-section, taken along the line II—II of Figure 1;

Figure 3 is a cross-sectional view of a modified form of the joint shown in Figure 2;

Figure 4 is still a further modified form of the joint construction shown in Figure 2;

Figure 5 is a plan view of a modified form of upper control arm and mounting for an independent vehicle suspension incorporating the principles of the present invention;

Figure 6 is an enlarged cross-sectional view taken along the line VI—VI of Figure 5 illustrating the pivotal connection used in the modification of Figure 5; and Figure 7 is a cross-sectional view illustrating a modified form of the pivot connection shown in Figure 6.

As shown on the drawings:

As may be seen from a consideration of Figure 1, the present invention may be used with the independent suspension of a front vehicle wheel. As there shown in diagrammatic form, a conventional wheel support spindle 10 is universally pivotally carried by upper and lower control arms 11 and 12 by ball joint connections 13 and 14, respectively. The control arms 11 and 12 are in turn supported for pivotal movement about respective horizontally disposed axes 15 and 16. The axes 15 and 16 are formed by brackets 17 and 18 rigidly secured at spaced points on a conventional transverse vehicle frame member 20. Conventional spring means (not shown) are provided between the lower control arm and the vehicle frame 20 to urge the control arms 11 and 12 to pivot in a clockwise direction around their axes 15 and 16 as viewed in Figure 1. Each of the brackets 17 and 18 is, in the form shown in Figure 1, provided with laterally formed ears. These are designated at 17a and 18a, respectively, and rigidly carry pivot bars or studs 21, the longitudinal axes of which provide the pivot axes 15 and 16 illustrated.

By providing the pivot arms in the form of brackets 17 and 18, it is possible to utilize four identical pivot joints 22 to support the control arms for pivotal movement. A first embodiment of such a pivot joint may be seen from a consideration of Figure 2 wherein an enlarged cross-sectional view of such a joint is illustrated. As shown, the stud or bar 21 passes through a pivot arm bracket ear 17a and is secured thereto by a tapered portion 21a and a nut 23 in a conventional manner. The stud 21 has a cylindrical bearing portion 21b, a radial flanged bearing portion 21c and a segmental spherical portion 21d, the latter two portions combining to form an enlarged convex stud head. The outer housing or shell of the joint 22 comprises a substantially cylindrical sheet metal cupped housing or container 25 having an inwardly flanged annular aperture defining rim 26 and a spun over annular retaining rim 27 which cooperates with a stamped segmental spherical concave closure plate 28. A resilient seal 19 prevents ingress of dirt into the joint and egress of initial lubricant therefrom.

A semi-resilient plastic liner, preferably constructed of a high molecular weight polyamide, such as for example "nylon," or of polyethylene, which substances are substantially self-lubricating, is positioned over the stud 21. This liner 29 has a radially outwardly projecting flange 30 at the end thereof adjacent the flange 22c of the stud 22. A resilient annular sleeve 31 is positioned between the outer container wall 25 and the liner 29 and is confined at its ends on the right by the retainer rim 26 and on the left by the radial flange 30 of the liner. As may be seen, the container 25 is provided with a slight radial relief 32 and the resilient annulus 31 occupies a longitudinal space slightly longer than the cylindrical portion of the container 25. The container 25 is press fitted into one of the corners of the upper or lower control arms 11 and 12 for rotation therewith thereby providing a stud part 17 secured to the pivot arm bracket and a housing or container part 25 secured to the control arm.

In operation of the parts as above described, and considering only the pivotal connection at the upper control arm 17 for purposes of example, it will be noted that rotation of the control arm will cause simultaneous rotation of the housing or container 25 press fitted thereto, relative to the frame 20. This rotational movement is accommodated by the semi-resilient plastic liner 29 which has a sufficiently low coefficient of friction to permit ready pivotal movement of the stud 21 therein. Accordingly, during conditions of solely pivotal rotational movement caused by pivoting of the upper control arm 11, the rubber annulus 31 receives no torsional stresses.

If, during the initial installation of the parts, there is a slight misalignment between the control arm and one or both of the ears 17a of the pivot arm bracket 17, such misalignment will be accommodated by the resilient material 31. This is permitted since in the situation in which the axis of the stud 21 is slightly tilted relative to the axis of the housing container 25, a small amount of the resilient material will be transferred from one side of the stud adjacent one end of the annulus to the opposite side of the stud without unseating the segmental spherical stud head portion 21d from its mating surface on the closure plate 28. If, however, during operation of the vehicle a shock is imparted to the control arm 11 tending to move the control arm as a unit in a generally horizontal plane toward the transverse frame member 20, or in any lateral direction relative to the axis 15 such that both of the pivot studs 21 associated with the arm 11 attempt to move transversely of their axis the joints 22 will prevent such movement.

Lateral movement in the joints 22 is resisted by the resilient material 31. For example, if the stud 21, as shown in Figure 2, were moved upwardly relative to the housing 25, the segmental spherical portion 21d of the stud would contact the upper side of the concave segmental spherical socket in the closure plate 28. Continued lateral movement of the stud 21 in an upward direction could not then occur unless the stud moves axially toward the right as viewed in Figure 2, causing the convex segmental spherical portion 21d to ride up out of the closure plate socket. However, such axial movement causes the resilient material 31 to be compressed between the rim 26 and the stud flange 21c which acts through the bearing liner flange 30. While the material 31 is resilient, it is substantially incompressible when completely confined and such axial movement is accordingly strongly resisted. Upon the build-up of extremely large forces, slight axial movement of the stud 21 is permitted by the slight compressibility of the resilient material 31 and in extreme cases the bearing flange 30 may abut against the radial relief flange 32 in the housing 25 to provide a positive stop against further movement. It will, therefore, be clear that attempted lateral movement of the control arm 11, as well as the control arm 12 which is similarly mounted, is permitted except for very minor increments. The small amount of lateral movement resiliently provided by the structure above described, permits vibrations set up at the wheel support 10 to be damped and absorbed without providing instability of the joint ordinarily accompanying the use of rubber bushings of the prior art types which do not resist lateral joint movement except by the nominal resistance forces developed by rubber under unconfined compression.

In the embodiment of the joint illustrated in Figure 3, the components are identical to those above described relative to the joint 22 except for the addition of an additional semi-resilient plastic liner of "nylon." This additional liner is shown at 35 and cooperates with the segmental spherical convex surface 21d of the stud 21 thereby removing rotary frictional forces from the closure cap 28. By the use of this additional liner, all rotary bearing surfaces of the joint comprise metal sliding on bearing liner material. Since, as above noted, the high molecular weight polyamides, such as "nylon" are essentially self-lubricating and have low coefficients of friction when operating in conjunction with smooth steel parts the fully lined joint of Figure 3 provides a very satisfactory anti-friction control arm pivot.

In some installations, it may be found that space limitations make the segmental spherical projection on the closure plate 28 undesirable. In such event, or in case for any other reason the convex stud head is considered undesirable, the convex and concave surfaces of the stud head 21d and the closure plate 28 may be reversed as shown in the modification of Figure 4. As there illustrated, the housing 25, annular resilient bushing member 31, the nylon liner 29 and closure plate 28 are substantially identical to the similar parts shown in Figures 2 and 3. However, the stud 220 is provided with a segmental spherical recess 221 rather than a convex projection. This recess cooperates with the outside surface of the segmentally spherically dimpled closure plate 28 which is inserted in the housing 25 in a manner opposite to that illustrated in the forms of Figures 2 and 3. It will be realized that the operation of the pivot joints of Figures 2 and 4 is identical since attempted lateral movement of the stud 220 will require the stud to move axially as a result of contact with the segmental spherical surface of the closure plate 28. It will be understood, of course, that an additional liner 35 may be provided between the stud surface 221 and the closure plate 28 in the form shown in Figure 4, similar to that discussed above relative to Figure 3, if the damping qualities provided by the slight amount of friction between the metal stud and closure plate is not desired for any particular installation.

It will be appreciated that variations in over-all independent suspension design may require that still further modified forms of the pivot joint be utilized to accomplish the functions above described. For example, it has been proposed in some instances that the control arms of the suspension be pivoted from a fixed pivot bar rather than a bracket, thereby eliminating separate studs. Such an arrangement is illustrated in Figures 5, 6 and 7 wherein an upper control arm 110 is shown pivoted about a pivot bar 170 which may in turn be secured by bolt apertures 171 to transverse frame member 20. In this embodiment of the invention, the pivot bar 170 itself provides the cylindrical bearing surfaces of the pivot joints, rather than separate studs secured to the bar 170 as in the form shown in Figure 1. Details of such an integrated pivot bar and bearing may be seen from a consideration of the enlarged view in Figure 6.

As illustrated in Figure 6, the pivot bar 170 is provided with a pair of identical cylindrical extensions 172, only one of which is illustrated. The cylindrical projection 172 cooperates with a semi-resilient plastic anti-friction bearing liner 29, an annular resilient member 31 and outer housing 25 all of which are substantially identical to the similar parts illustrated in Figures 1 through 4. However, since no separate studs are utilized in the construction of Figure 5, the liner 29, annulus 31 and housing 25 must be assembled onto the cylindrical surface 172 of the pivot bar 170 from outside of the control arm 110, or from the left as viewed in Figure 6. This necessitates, of course, that the enlarged head portion associated with the cylindrical extension 172 be a separate part. It is so shown at 173 in Figure 6 and comprises a segmental spherical convex bearing portion 174, a radially projecting flange 175 and a support stud 176 which cooperates with an axially extending bore 177 in the pivot bar 170. The convex segmental spherical projecting surface 174 cooperates with the concave segmental spherical mating surface and the closure plate 28 in the same manner as described relative to the surface 21d in the embodiment shown in Figure 2.

While the head portion 173 is free to rotate relative to the pivot bar 170 and, additionally, is not fixedly secured axially relative thereto, nevertheless the operation of the embodiment shown in Figure 6 is substantially the same as that of the forms shown in Figures 1 through 4. Thus, while the resilient annulus 31 will permit slight misalignment between the axis of the pivot bar 170 and the axis of the housing 25, lateral movement of the housing 25, caused by movements of the arm 110 in a direction transverse to the axis of the pivot bar 170 are strongly resisted. This occurs since such lateral movements will cause the enlarged head 173 to move laterally with the pivot bar 170 relative to the housing 25 and accordingly unseat relative to the concave socket in the closure plate 28. Such unseating movement forces the head 173 to move toward the right relative to the housing 25, axially compressing the annulus 31 between the radial flange 175 and the surface 32 of the housing 25. Rotational movements of the arm 110 relative to the pivot bar 170 are permitted by the bearing relationship between the liner 29 and the cylindrical surface 172. If the fit between the stud 176 and the bore 177 is a tight fit, as may in some cases be utilized, rotation will also take place between the radial flange 175 and the radial flange 30 of the plastic liner 29. Alternatively, however, a bearing fit may be provided between the stud 176 and the bore 177 either by grinding both of the parts or by inserting a bearing bushing therebetween. In the latter case and under ordinary loads, the enlarged head 173 would ordinarily not rotate with the pivot bar 170 but would, instead, move with the housing 25.

In the embodiment shown in Figure 7 substantial expense has been eliminated by eliminating the relatively complex enlarged head 173 shown in Figure 6. This has been accomplished by providing a frusto-conical bearing surface 180 on the end of the cylindrical extension 181a of a modified form of pivot bar 181. A stamped bearing plate 182 has a substantially conical internal bearing surface 183 for cooperation with the bearing surface 180, and a substantially segmental spherical external convex surface 184 for cooperation with the concave segmental spherical surface of the closure plate 28. The bearing liner 29, resilient annulus 31 and housing member 25 are substantially identical to those elements illustrated and described in the remaining forms above discussed. In view of the fact that the bearing plate 182 is snugly resiliently confined between the surface 180 and the closure plate 28, movements of the pivot bar 181 relative to the control arm 110, lateral to the axis of the pivot bar will cause the bearing plate 182 to move with the cylindrical bearing extension 181a relative to the housing 25. Such movement will, as in the embodiments above discussed, cause the bearing plate 182 to unseat relative to the socket in the closure plate 28 and, upon such unseating, move axially toward the right compressing the resilient annulus 31 which is substantially completely confined and accordingly strongly resists such axial movement.

As thus described, the present invention provides completely controlled resiliency in suspension arm pivots. Although resiliency is provided for purposes of minimizing misalignment problems, and in order to dampen shocks of a high frequency character, this resiliency does not provide instability in the suspension since it does not permit any substantial lateral movements of the arm relative to its support pivots. This is accomplished since the resilient annulus 31 is confined at its outer end by the enlarged stud head, and at its inner end by the radially inturned housing flange 26 and the inner extremity of the liner 29, indicated at 29a. While slight gaps are provided between the radial flange of the enlarged head and the housing stop surface 32, as well as between the radial inturned flange 26 and the liner 29 these gaps are small in relation to the quantity of resilient material and greatly magnify the resistance to material flow ordinarily found in resilient materials themselves, such as for example rubber. In operation, therefore, after only very slight axial movement, resulting from attempted lateral movement of the control arm relative to the pivot bar, the resilient material is confined to an extent that continued axial movement is not permitted under ordinary load conditions. As a result, an unusually stable vehicle wheel suspension is provided which has all of the desirable aspects of resiliency but none of the undesirable ones.

It will, of course, be apparent to those skilled in the art that variations and modifications, in addition to those above described, may be made in accordance with the principles of the present invention without departing from the scope of the novel concepts thereof. Accordingly, it is my intention that the present invention be limited solely by the scope of the hereinafter appended claims.

I claim as my invention:

1. A suspension for an independently mounted wheel comprising a frame member, a wheel support spindle, a first control arm pivotally secured to said frame by a first substantially horizontally pivoted joint socket and universally secured to one end of said spindle, a second control arm pivotally secured to said frame at a point vertically removed from said first joint socket by a second substantially horizontally pivoted joint socket and universally secured to the other end of said spindle, each of said joint sockets comprising a pivot bar mounted for rotation within a body of resilient material supported in a housing whereby said bar may be angularly misaligned relative to said housing, and means associated with said bar for confining and compressing said resilient material in a direction axial of said pivot bar upon movement of said pivot bar relative to the housing and in a direction transversely of its axis whereby such lateral movement is resisted.

2. A suspension for an independently mounted wheel comprising a frame member, a wheel support spindle, first and second control arm members secured to first and second vertically spaced ends of said spindle, first and second resilient pivot means securing the ends of said respective arm members to said frame member for pivotal movement about vertically spaced substantially horizontal pivot axes, said pivot means comprising a housing secured to one of said members and a stud secured to the other of said members, a substantially cylindrical resilient sleeve positioned between said stud and said housing, first means confining said sleeve against movement out of said housing in one axial direction, second means confining said resilient sleeve against movement in the opposite direction, rotatable bearing means between said stud and said sleeve, and third means associated with said stud and said housing for forcing said second means toward said first means upon movement of said stud relative to said housing in a direction transverse to the axis of the stud.

3. A suspension for an independently mounted wheel comprising a frame member, a wheel support spindle, a control arm member pivotally secured to one end of said spindle, resilient pivot means securing the other end of said arm member to said frame member for pivotal movement about a substantially horizontal pivot axis, said pivot means comprising a housing secured to one of said members and a pivot stud secured to the other of said members, a substantially cylindrical resilient sleeve positioned between said stud and said housing, first means confining said resilient sleeve against movement out of said housing in one axial direction, second means confining said resilient sleeve against movement in the opposite direction and third means associated with said stud and said housing for forcing said second means toward said first means upon movement of said pivot stud relative to said housing in a direction transverse to the axis of the stud.

4. A suspension for an independently mounted wheel comprising a frame member, a wheel support spindle, a control arm member pivotally secured to one end of said spindle, resilient pivot means securing the other end of said arm member to said frame member for pivotal movement about a substantially horizontal pivot axis, said pivot means comprising a housing secured to one of said members and a pivot bar secured to the other of said members, a substantially cylindrical resilient sleeve positioned between said bar and said housing, first means confining said resilient sleeve against movement out of said housing in one axial direction, second means confining said resilient sleeve against movement in the opposite direction, semi-resilient plastic self-lubricating bearing means between said pivot bar and said sleeve and third means associated with said bar and said housing for forcing said second means toward said first means upon movement of said pivot bar relative to said housing in a direction transverse to the axis of the pivot bar.

5. A suspension for an independently mounted wheel comprising a frame member, a wheel support spindle, a control arm member pivotally secured to one end of said spindle, resilient pivot means securing the other end of said arm member to said frame member for pivotal movement about a substantially horizontal pivot axis, said pivot means comprising a housing secured to one of said members and a pivot bar secured to the other of said members, a substantially cylindrical resilient sleeve positioned between said bar and said housing, first means confining said resilient sleeve against movement out of said housing in one axial direction, second means confining said resilient sleeve against movement in the opposite direction, semi-resilient plastic self-lubricating bearing means between said pivot bar and said sleeve, and third means associated with said bar and said housing for forcing said second means toward said first means upon movement of said pivot relative to said housing bar in a direction transverse to the axis of the pivot bar, said third means comprising a head member mounted for movement with said bar and snugly seated in an axially facing recess in said housing whereby transverse movement of said bar and head relative to the housing requires said head to move out of said recess against said sleeve.

6. A suspension for an independently mounted wheel comprising a frame member, a wheel support spindle, a control arm member pivotally secured to one end of said spindle, resilient pivot means securing the other end of said arm member to said frame member for pivotal movement about a substantially horizontal pivot axis, said pivot means comprising a housing secured to one of said members and a pivot bar secured to the other of said members, a substantially cylindrical resilient sleeve positioned between said stud and said housing, first means confining said resilient sleeve against movement out of said housing in one axial direction, second means confining said resilient sleeve against movement in the opposite direction, semi-resilient plastic self-lubricating bearing means between said pivot bar and said sleeve and third means associated with said pivot bar and said housing for forcing said second means toward said first means upon movement of said pivot bar relative to said housing in a direction transverse to the axis of said pivot bar, said third means comprising an enlarged head member integral with said bar and seated in an axially facing recess in said housing whereby the transverse movement of said bar and head member relative to the housing requires said head member to move out of said recess into confining engagement against said sleeve.

7. A suspension for an independently mounted wheel comprising a frame member, a wheel support spindle, a control arm member pivotally secured to one end of said spindle, resilient pivot means securing the other end of said arm member to said frame member for pivotal movement about a substantially horizontal pivot axis, said pivot means comprising a housing secured to one of said members and a pivot bar secured to the other of said members, a substantially cylindrical resilient sleeve positioned between said bar and said housing, first means confining said resilient sleeve against movement out of said housing in one axial direction, second means confining said resilient sleeve against movement in the opposite direction, thin semi-resilient self-lubricating plastic bearing liner means between said bar and said sleeve and between said second means and said sleeve and third means associated with said bar and said housing for forcing said second means toward said first means upon movement of said bar relative to said housing in a direction transverse to axis of said bar, said third means comprising a head portion mounted for movement with said bar and snugly cooperating with a dimpled axially facing housing closing portion whereby transverse movement of said bar and head portion relative to the housing requires said head portion to move away from said closure portion against said sleeve.

8. A suspension for an independently mounted wheel as set forth in claim 7 wherein the dimple in said housing closure portion comprises a cavity opening for said sleeve and said head portion comprises a convex surface for cooperation with said cavity.

9. A suspension for an independently mounted wheel as set forth in claim 7 wherein the dimple of said housing closure portion comprises a projection extending toward said sleeve and said head portion has a concave depression in the end thereof for cooperation with said projection.

References Cited in the file of this patent

UNITED STATES PATENTS

| | | |
|---|---|---|
| 2,196,702 | Leighton | Apr. 9, 1940 |
| 2,290,678 | Dodge | July 21, 1942 |
| 2,456,480 | Austin | Dec. 14, 1948 |
| 2,556,767 | McCann | June 12, 1951 |

FOREIGN PATENTS

| | | |
|---|---|---|
| 640,469 | Great Britain | July 19, 1950 |